(12) United States Patent
Tanaka

(10) Patent No.: US 8,958,090 B2
(45) Date of Patent: Feb. 17, 2015

(54) IMAGE FORMING APPARATUS INCLUDING AN AUTHENTICATION PROCESSOR, METHOD, AND COMPUTER READABLE MEDIUM

(75) Inventor: Hironori Tanaka, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 120 days.

(21) Appl. No.: 13/473,999

(22) Filed: May 17, 2012

(65) Prior Publication Data

US 2013/0163031 A1 Jun. 27, 2013

(30) Foreign Application Priority Data

Dec. 27, 2011 (JP) ................................ 2011-286834

(51) Int. Cl.
*G06K 15/00* (2006.01)

(52) U.S. Cl.
USPC ......................................... 358/1.14; 358/1.15

(58) Field of Classification Search
CPC ..... G06F 3/1204; G06F 3/1205; G06F 3/122; G06F 3/1232; G06F 3/1271; G06F 3/1206; G06F 3/1228; G06F 3/1238; G06F 3/1288; H04L 41/0803
USPC .............................................. 358/1.14, 1.15
See application file for complete search history.

(56) References Cited

U.S. PATENT DOCUMENTS

| | | | |
|---|---|---|---|
| 8,390,838 B2 * | 3/2013 | Sawada et al. | 358/1.14 |
| 2012/0057193 A1 * | 3/2012 | Jazayeri et al. | 358/1.15 |
| 2012/0162713 A1 * | 6/2012 | Minamiyama | 358/1.15 |
| 2012/0268769 A1 * | 10/2012 | Kashioka | 358/1.14 |

FOREIGN PATENT DOCUMENTS

| | | |
|---|---|---|
| JP | A-2003-76509 | 3/2003 |
| JP | A-2010-146353 | 7/2010 |

OTHER PUBLICATIONS

English Machine Translation of JP 2010-289447-A (Minamiyama, Published Dec. 27, 2010, related to U.S 2012/0162713 A1).*

* cited by examiner

*Primary Examiner* — Benny Q Tieu
*Assistant Examiner* — Juan M Guillermety
(74) *Attorney, Agent, or Firm* — Oliff PLC

(57) ABSTRACT

An image forming apparatus includes an authentication processor, a registration unit, and a print unit. The authentication processor performs a process for user authentication with respect to a user in response to an authentication request from the user. The registration unit registers the image forming apparatus with a print service system on a network as a printer to be used by the user by transmitting, to the print service system, a registration request including user information of the user and information about the image forming apparatus in the case where the user authentication has been successfully performed. The print unit receives, from the print service system, a print instruction to print an electronic document and executes printing in response to the print instruction.

6 Claims, 5 Drawing Sheets

FIG. 3

| SETTING ITEM | SETTING VALUE |
|---|---|
| PRINTER NAME | Printer-A |
| USER ID | User-A |
| PRINTER CAPABILITY INFORMATION | COLOR MODE ("COLOR", "BLACK-AND-WHITE") |
| | DUPLEX PRINTING ("NO DUPLEX PRINTING") |
| | STAPLING ("NO STAPLING", "LEFT SIDE", "UPPER SIDE", "LEFT UPPER SIDE") |
| | PUNCHING ("NO PUNCHING", "LEFT SIDE", "RIGHT SIDE", "UPPER SIDE", "LOWER SIDE") |
| | PAPER FOLDING ("NO FOLDING", "FOLDING IN HALF", "FOLDING IN Z SHAPE") |

IMAGE FORMING APPARATUS INCLUDING AN AUTHENTICATION PROCESSOR, METHOD, AND COMPUTER READABLE MEDIUM

CROSS-REFERENCE TO RELATED APPLICATIONS

This application is based on and claims priority under 35 USC 119 from Japanese Patent Application No. 2011-286834 filed Dec. 27, 2011.

BACKGROUND (i) Technical Field

The present invention relates to an image forming apparatus, an image forming method, and a computer readable medium.

(ii) Related Art

An on-demand print system enables a user to output print jobs, which are accumulated in a print service (server), from any image forming apparatus registered with the print service. A user transmits print jobs to a print service and registers them. Then, the user selects print jobs in the print service from an operation screen of an image forming apparatus at which printing is to be performed, and provides an instruction to perform printing.

Heretofore, to configure an on-demand print system, it has been necessary for a user or a system administrator to associate, in advance, a print service with all of the image forming apparatuses which may be used by the user. In addition, a typical print service has been installed in a user site, such as a company or a school, and registration of image forming apparatuses and output of print jobs have been performed only within the user site.

On the other hand, like Google Cloud Print which Google Inc. has been developing, a print service available on the Internet (hereinafter, referred to as a "cloud print service" to be distinguished from a typical print service) has been recently provided or proposed.

Typically, in a cloud print service such as Google Cloud Print, printers which may be used by a user are registered with the print service in advance, and the user selects a printout destination among these printers registered in advance. It is not basically assumed that a printer that has not been identified in advance (e.g., a printer installed at a convenience store which the user passes by on the business trip) is used. However, in a cloud print service, all of the image forming apparatuses which are connected to the Internet may be potential candidates for an output destination. Accordingly, to make it possible to use a printer that has not been identified in advance will increase convenience.

To achieve this, for example, it is necessary for an administrator to register in advance all of the image forming apparatuses that may be used, with a print service. However, this is practically impossible. In addition, in Google Cloud Print, since an access right to an image forming apparatus is set for each user, settings, the number of which is equal to the result obtained by multiplying the number of users by the number of image forming apparatuses, are required to be performed. It is not practical to perform these settings in advance.

SUMMARY

According to an aspect of the present invention, there is provided an image forming apparatus which includes an authentication processor, a registration unit, and a print unit. The authentication processor performs a process for user authentication with respect to a user in response to an authentication request from the user. The registration unit registers the image forming apparatus with a print service system on a network as a printer to be used by the user by transmitting, to the print service system, a registration request including user information of the user and information about the image forming apparatus in the case where the user authentication has been successfully performed. The print unit receives, from the print service system, a print instruction to print an electronic document and executes printing in response to the print instruction.

BRIEF DESCRIPTION OF THE DRAWINGS

Exemplary embodiment of the present invention will be described in detail based on the following figures, wherein:

FIG. 3 is a diagram illustrating exemplary information included in a registration request transmitted to a print service by an image forming apparatus;

DETAILED DESCRIPTION

Figure 1:
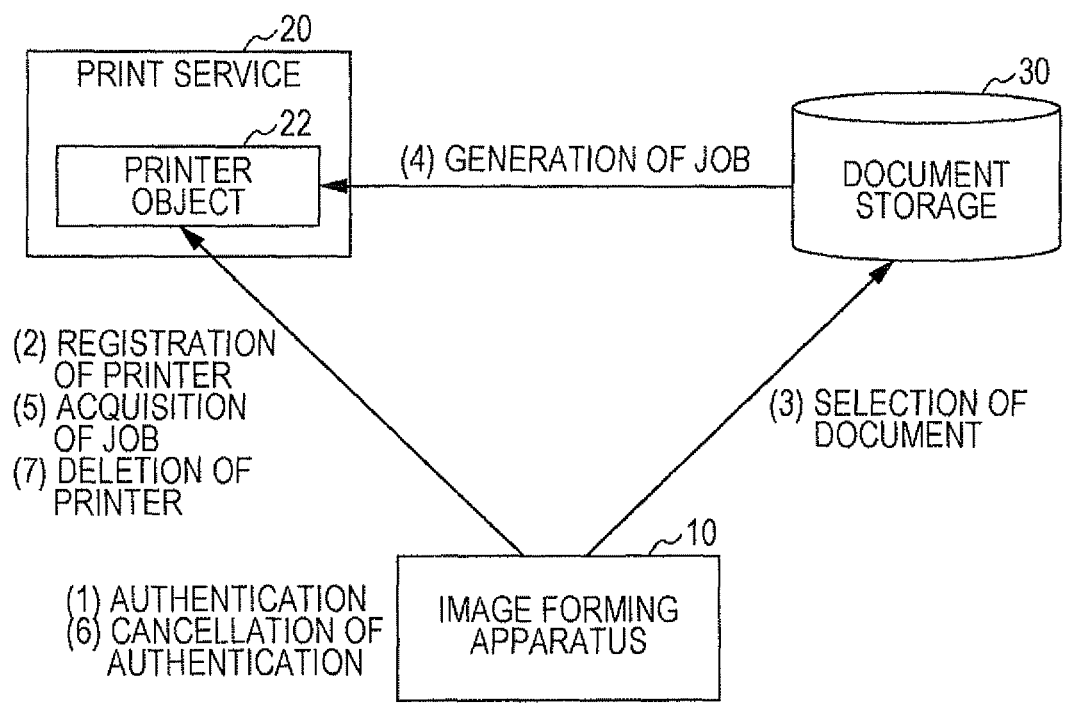
FIG. 1 is a diagram illustrating an exemplary system configuration according to an exemplary embodiment of the present invention.

FIG. 1 illustrates an exemplary system configuration according to an exemplary embodiment of the present invention. The exemplary system illustrated in FIG. 1 includes an image forming apparatus 10, a print service 20, and a document storage 30. It is possible for the image forming apparatus 10, the print service 20, and the document storage 30 to communicate with each other via a network such as the Internet.

The image forming apparatus 10 is an apparatus for printing print data that is received on paper. The image forming apparatus 10 may have functions other than a print function. That is, the image forming apparatus 10 may be, for example, a so-called digital multi-function device having a scanning function, a copy function, a fax transmission function, and an email transmission function other than the print function. FIG. 1 illustrates only one image forming apparatus 10, but more than one image forming apparatus 10 may be included in the system.

The print service 20 is a system which provides print service to users over a network such as the Internet. The print service 20 may be configured with a single server, or may be a system configured with multiple computers like a cloud service. For example, Google Cloud Print is an example of the print service 20.

A user registers an account of the user with the print service 20. In response to an instruction from the user, the print service 20 registers the image forming apparatus 10 that may be used by the user, in a manner that the image forming apparatus 10 is associated with the account of the user. A printer object 22, which is an object for managing the registered image forming apparatus 10, is created in the print service 20.

The printer object 22 holds various types of management information about the image forming apparatus 10 to be managed. The management information includes, for example, the identification information of the image forming apparatus 10, such as a printer name, capability information indicating capabilities (functions) owned by the image forming apparatus 10, and the identification information of the user who has registered the image forming apparatus 10, such as a user ID. The capability information includes, for example, information about whether or not the image forming apparatus 10 is capable of duplex printing, and information about whether or not the image forming apparatus 10 is capable of full-color printing. When the image forming apparatus 10 is provided with a finisher, the capability information also includes information about capabilities owned by the finisher, such as a stapling function, a punching function, and a folding function.

The printer object 22 has a queue of print jobs from the user who has specified the image forming apparatus 10 corresponding to the printer object 22 as an output destination. The printer object 22 communicates with the corresponding image forming apparatus 10, sequentially obtains information about the execution state of a print job that has been transmitted to the image forming apparatus 10, e.g., state information, such as "in execution" and "end of execution", and manages information about the execution state of the print job. The printer object 22 may be configured so as to obtain state information which indicates a state of the image forming apparatus 10 itself, such as "power-off", "paper out", or "during printing", from the image forming apparatus 10 and manage the state information.

The document storage 30 is a database that stores electronic documents for users. Each user accesses the document storage 30 from, for example, a personal computer (PC) of the user, and registers an electronic document. The registered electronic document is stored in such a manner that the electronic document is associated with the user. In addition, the document storage 30 may enable access rights of users to be set with respect to registered electronic documents. In this case, even if a user has not registered an electronic document, when an access right of allowing printing of the electronic document is given to the user, the user is allowed to give instructions to print the electronic document.

To achieve printing by using the image forming apparatus 10 that has not been registered in advance with the print service 20, the following mechanism is employed. When a user performs user authentication in order to use the image forming apparatus 10, the image forming apparatus 10 executes a registration program of the print service 20 so as to register the image forming apparatus 10 itself with the print service 20. Thus, the image forming apparatus 10 is registered with the print service 20 without a troublesome procedure performed by a user or a system administrator, and it is possible to perform on-demand printing at the image forming apparatus 10 via the print service 20. In addition, the registration of the image forming apparatus 10 with the print service 20 may be deleted at a time point when it is determined that the user has stopped using the image forming apparatus 10.

Operations (1) to (7) illustrated in FIG. 1 indicate an exemplary process flow in the case where a user performs printing by using the image forming apparatus 10 that has not been registered in advance with the print service 20.

That is, according to the exemplary embodiment, when a user performs user authentication with respect to the image forming apparatus 10 in operation (1), the image forming apparatus 10 registers itself with the print service 20 as a printer used by the user, in operation (2). Through this registration operation, a printer object 22 which creates and manages a print job for the image forming apparatus 10 is created in the print service 20. In operation (3), the user accesses the document storage 30 from the image forming apparatus 10, obtains a list of electronic documents registered in advance with the document storage 30 by the user (or electronic documents in the document storage 30 for which the user is given authority to perform printing), and selects electronic documents to be printed at this time point from the list. In operation (4), the document storage 30, which receives this selection, generates a print instruction to print the electronic documents, and transmits the electronic documents and the print instruction information for the electronic documents to the printer object 22 that has been created in the print service 20 in operation (2). Receiving the electronic documents and the print instruction information for the electronic documents, the printer object 22 generates a print job, and notifies the image forming apparatus 10 that the print job has been generated. In operation (5), the image forming apparatus 10 accesses the print service 20 so as to obtain the print job from the printer object 22, and executes the obtained print job. Thus, the electronic documents selected by the user are printed out at the image forming apparatus 10. In operation (6), after the execution of printing, when the state where the image forming apparatus 10 has not been operated by the user continues because, for example, the user has left the place where the image forming apparatus 10 is installed or a predetermined time period has elapsed since the end of the printing for the print job, the user authentication is canceled. A state where a user is authenticated continues during a time period from the time point when the image forming apparatus 10 succeeds in authenticating the user to the time point when the authentication is explicitly canceled or implicitly canceled in accordance with a predetermined condition, and is a state where the image forming apparatus 10 is determined to be occupied by the user who is using it locally. An operation performed during the state where a user is authenticated, on an input apparatus included in the image forming apparatus 10 is recognized as an operation performed by the user, and, for example, charge for the printing performed as a result of the operation or for other processing services is associated with the user. The user authentication is implicitly canceled in the case where, for example, the user has not operated the image forming apparatus 10 over a predetermined time period since the end of the print job executed in response to an instruction of the user. In operation (7), when the user authentication is canceled, the image forming apparatus 10 transmits, to the print service 20, an instruction to delete the printer object 22 created when the user is authenticated. In response to the deletion instruction, the print service 20 deletes the printer object 22.

According to the exemplary embodiment, the printer object 22 corresponding to the image forming apparatus 10 is present in the print service 20 only during the time period in which the image forming apparatus 10 has been authenticated the user, i.e., the time period in which the user who has performed authentication is being determined to use the image forming apparatus 10.

Figure 2:
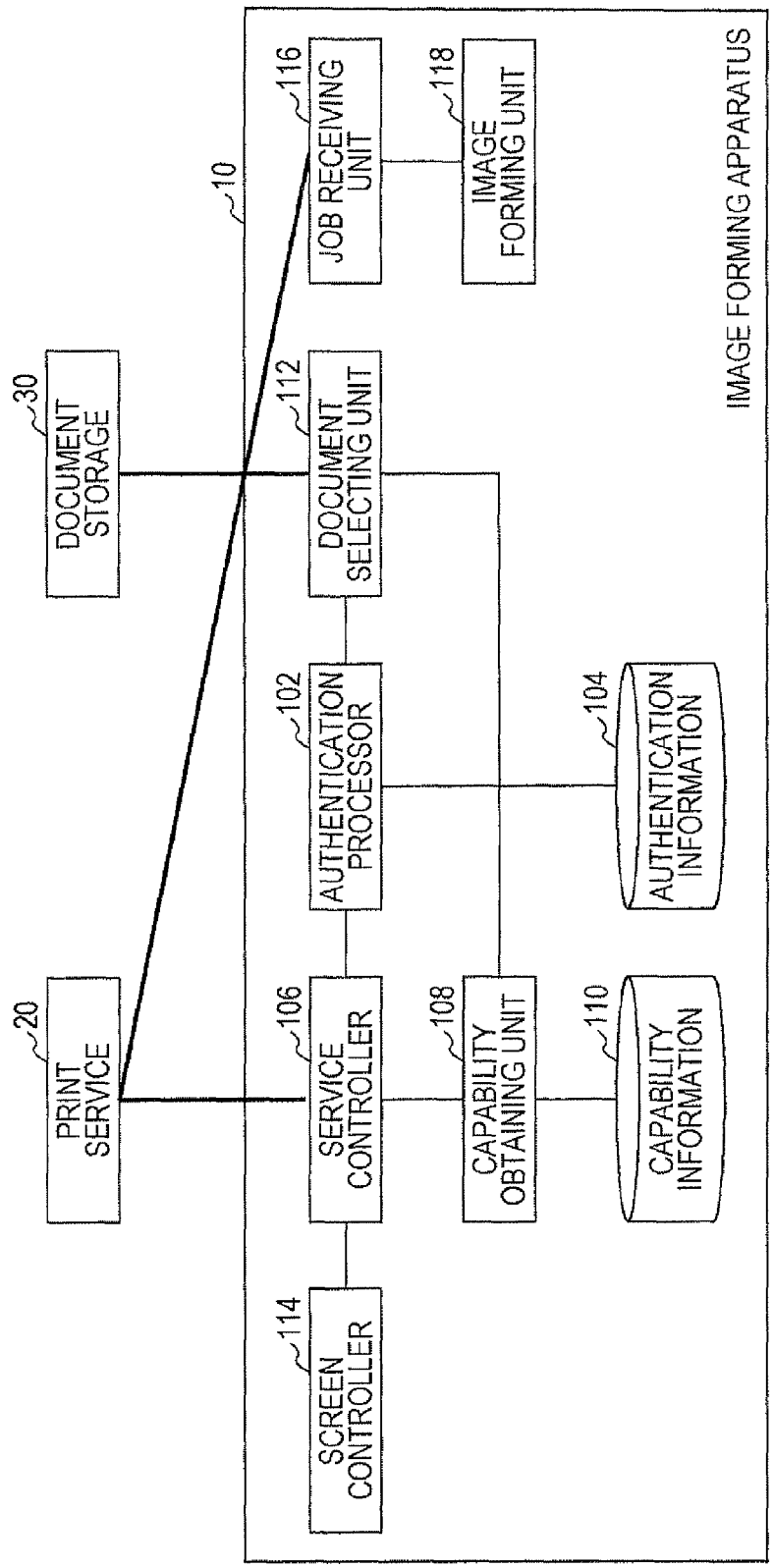
FIG. 2 is a diagram illustrating an exemplary internal configuration of an image forming apparatus.

FIG. 2 illustrates an exemplary internal configuration of the image forming apparatus 10 for achieving a process described above. The exemplary image forming apparatus 10 includes an authentication processor 102, a service controller 106, a capability obtaining unit 108, a document selecting unit 112, a screen controller 114, a job receiving unit 116, and an image forming unit 118.

The authentication processor 102 receives an authentication request from a user, and executes a process for user authentication. For example, when an authentication scheme using an integrated circuit (IC) card is employed as a user authentication scheme, the authentication processor 102 communicates with an IC card of the user via an IC card reader attached to the image forming apparatus 10 so as to determine whether the information specific to the user which is stored in the IC card matches the information registered on the system side, thereby authenticating the user. When an authentication scheme using a password is employed, the authentication processor 102 receives the input of a user ID and a password via an input apparatus, such as a keypad or a touch panel, provided for the image forming apparatus 10, and determines whether or not the input information matches the registered information, thereby authenticating the user. The authentication processor 102 may perform user authentication by itself, or may use authentication that is externally performed by an external authentication server. When the user authentication succeeds, authentication information 104, such as a user ID, of the user who has requested the authentication is determined. Until it is determined that the user has stopped using the image forming apparatus 10, that is, until the user authentication is canceled, the authentication processor 102 holds the authentication information 104. In this case, for example, in the case where the user explicitly performs an operation of canceling the user authentication, i.e., logging out, or where the user has not operated the input apparatus of the image forming apparatus 10 over a predetermined time period since the end of a print job that had been executed in response to an instruction of the user, the user authentication may be canceled.

The image forming apparatus 10, the print service 20, and the document storage 30 may have a configuration which allows single sign-on. In this case, when the authentication of a user succeeds in the authentication processor 102 of the image forming apparatus 10, the user is also capable of accessing the print service 20 and the document storage 30 without an authentication operation and, for example, giving instructions to them. In the case where a configuration which allows single sign-on is not employed, when a user who is authenticated by the image forming apparatus 10 accesses the print service 20 and the document storage 30 through the user interface of the image forming apparatus 10, the user may perform login authentication with respect to the print service 20 and the document storage 30.

The service controller 106 controls registration and deletion of the image forming apparatus 10 to the print service 20.

When the authentication processor 102 successfully performs the user authentication, the service controller 106 uses an application program interface (API) for registration of a printer which is released to the public by the print service 20, e.g., the "/register" interface in the case where the print service 20 is Google Cloud Print, and performs an operation for registering the image forming apparatus 10 with the print service 20. In this registration operation, the service controller 106 transmits, to the print service 20, parameters, such as a user ID that is included in the authentication information 104 of the user and that is obtained through the successful user authentication, and identification information of the image forming apparatus 10, e.g., a printer name specified by a system administrator or the user. In addition, the capability obtaining unit 108 may obtain capability information 110 that is stored in the image forming apparatus 10, and the service controller 106 may transmit, to the print service 20, the capability information 110 as another parameter when the registration operation is performed. The capability information 110 indicates processing capability with which the image forming apparatus 10 is provided, and includes at least one of, for example, the following items: color mode which indicates whether full-color printing or only black-and-white printing is enabled; the presence of duplex printing capability; the presence of stapling capability (when the stapling capability is available, available types of the stapling); the presence of punching capability (when the punching capability is available, available types of the stapling); and the presence of paper folding capability (when the folding capability is available, available types of the paper folding).

FIG. 3 illustrates exemplary registration information which the service controller 106 transmits to the print service 20 by using the printer registration API. In this example, the registration information includes a "printer name" that is identification information of the image forming apparatus 10, a user ID that is identification information of a user who is currently using the image forming apparatus 10, i.e., a user who is authenticated, and printer capability information that indicates the capabilities of the image forming apparatus 10 (and that corresponds to the capability information 110). In the example illustrated in FIG. 3, the image forming apparatus 10 is capable of printing in either of the color mode and the black-and-white mode, is incapable of duplex printing, is capable of stapling on either of the "left side", the "upper side", and the "left upper side" of a sheet, is capable of punching on either of the "left side", the "right side", the "upper side", and the "lower side" of a sheet, and is capable of paper folding in the "folding in half" mode or the "folding in a Z shape" mode.

The print service 20, which receives the registration request which includes such registration information from the service controller 106, uses the registration information to create a printer object 22 for the image forming apparatus 10. The printer object 22 holds the values of the items in the registration information. The created printer object 22 corresponds to the pair of the image forming apparatus 10 and the user. The print service 20 returns identification information that uniquely identifies the created printer object 22, to the service controller 106 as a response to the registration request.

The document selecting unit 112 transmits, to the document storage 30, a document list request including the user ID, which is included in the authentication information 104, of a user who is currently authenticated. In response to this request, the document storage 30 searches for stored electronic documents that are associated with the user, e.g., the electronic documents stored by the user or the electronic documents in which access rights of allowing printing of the electronic documents are given to the user, and returns a list of the electronic documents obtained through the search to the document selecting unit 112. The document selecting unit 112 generates a user interface screen for selection of documents on the basis of the list, and transmits the generated screen to the screen controller 114. The screen controller 114 displays the received screen on a display apparatus, such as a touch panel screen, of the image forming apparatus 10.

Figure 4:
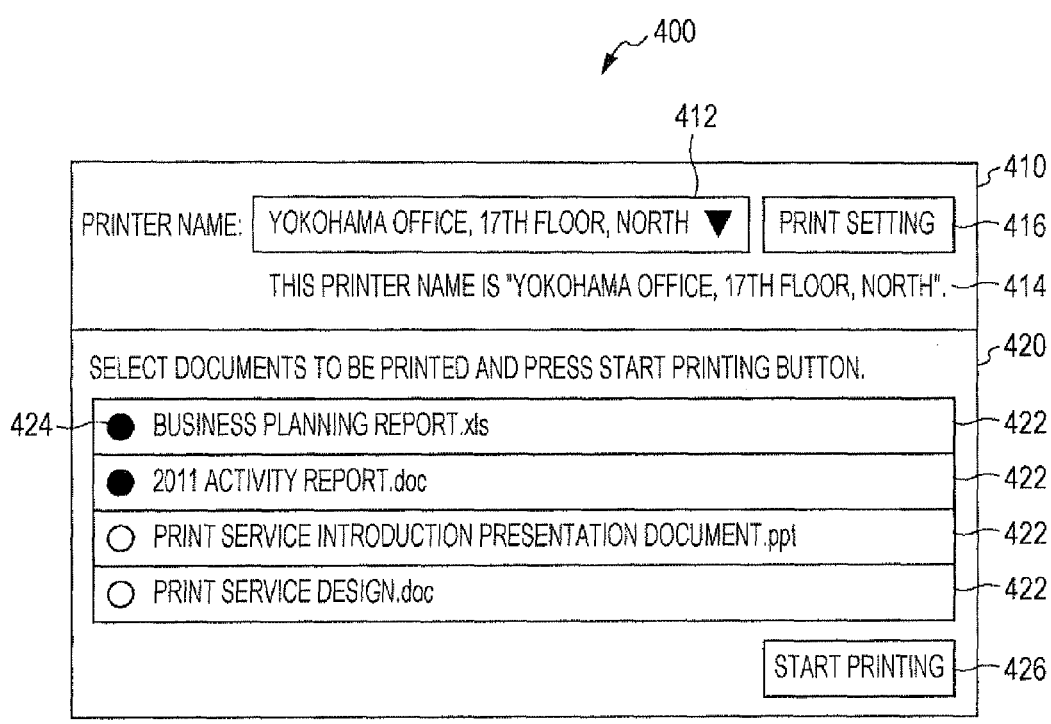
FIG. 4 is a diagram illustrating an exemplary user interface screen for, for example, selecting a print document.

FIG. 4 illustrates an exemplary document selection screen 400. The exemplary document selection screen 400 includes a printer selection field 410 and a document selection field 420.

In the printer selection field 410, a printer-name display field 412 is displayed which is used for displaying the registered name of a printer, i.e., the image forming apparatus 10, that is currently selected (in this example, "Yokohama office, 17th Floor, North"). This printer name "Yokohama office, 17th Floor, North" is a registered name of the image forming apparatus 10, and is a name of which the print service 20 is notified as a printer name of the image forming apparatus 10 when the service controller 106 registers a printer. The printer-name display field 412 is a drop-down list. When a user selects an icon having an inverted-triangle shape which is displayed on the right end of the printer-name display field 412 by operating an input apparatus, such as an arrow key or a touch panel, of the image forming apparatus 10, a list of registered names of the printers that are registered with the print service 20 is displayed as candidates which the user may use, in a drop-down form. The list information about the printers registered for the user is obtained from the print service 20, and the list display is generated on the basis of this information. The list information about the registered printers which is provided from the print service 20 includes the printer names of the registered printers and identification information of the printer objects 22 corresponding to the registered printers. In this example, the printer registered from the image forming apparatus 10 by the user is only the image forming apparatus 10, and therefore only the registered name "Yokohama office, 17th Floor, North" of the image forming apparatus 10 is displayed when the drop-down list is displayed. A message 414 "This printer name is 'Yokohama office, 17th Floor, North'" which is displayed under the printer-name display field 412 is a message that indicates the name of the image forming apparatus 10 which is registered with the image forming apparatus 10. The printer name registered with the print service 20 may be specified by a user. Accordingly, the printer name registered with the image forming apparatus 10 does not necessarily match the printer name registered with the print service 20. When the service controller 106 automatically registers the printer name that is registered with the image forming apparatus 10, with the print service 20 as the printer name of the image forming apparatus 10, both the printer names match each other.

When the user selects a print setting button 416 in the printer selection field 410, the document selecting unit 112 generates a setting screen for print conditions, and displays the generated setting screen on a display apparatus of the image forming apparatus 10 via the screen controller 114. An example of this setting screen is illustrated in FIG. 5.

Figure 5:
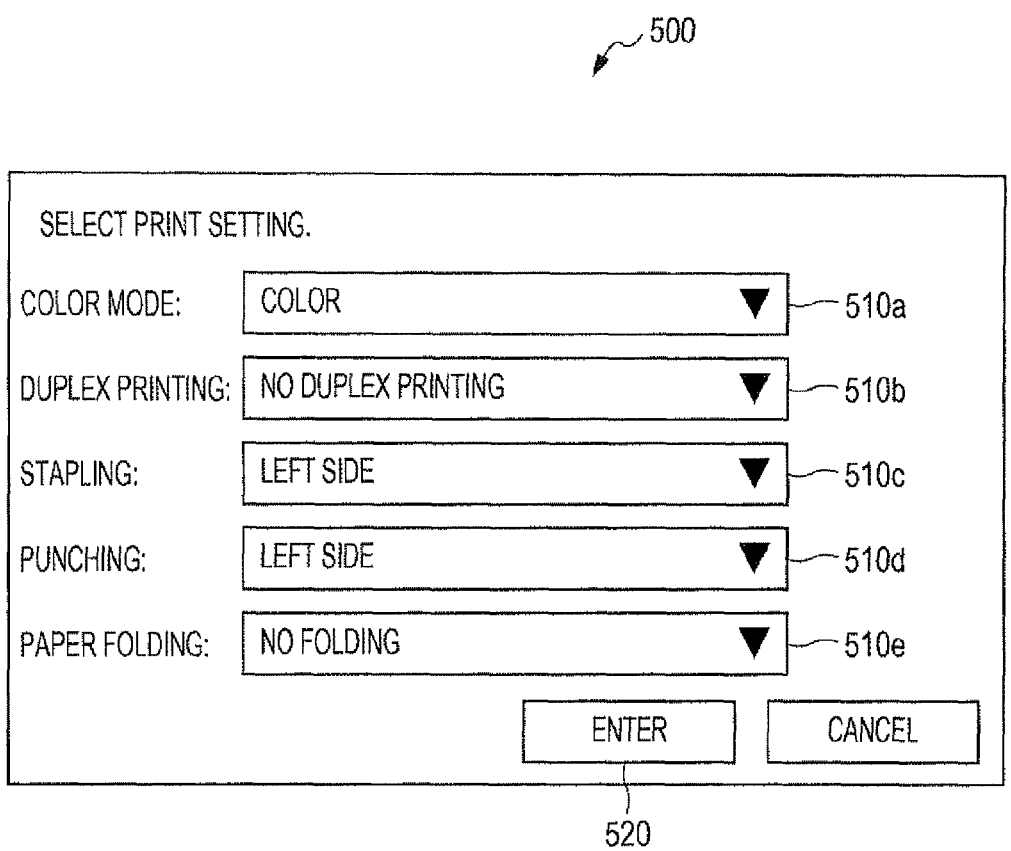
FIG. 5 is a diagram illustrating an exemplary print setting screen.

A print setting screen 500 illustrated in FIG. 5 corresponds to the printer capability information of the exemplary image forming apparatus 10 illustrated in FIG. 3. On the print setting screen 500, selection fields 510a to 510e are displayed which correspond to individual capability items that are indicated by the capability information and that are "color mode", "duplex printing", "stapling", "punching", and "paper folding". In each of the selection fields 510a to 510e, it is possible to display choices for the corresponding capability item in a drop-down list, e.g., "color" or "black-and-white" in the color mode, and the user selects a desired choice from the drop-down list. Upon selection of a determination button 520 on the print setting screen 500 after the user has selected choices for the capability items, a combination of the selected choices for the capability items is stored as user-specified print conditions. The print setting screen 500 may be generated by the document selecting unit 112 which refers to the capability information 110, or may be generated by the printer object 22 in the print service 20 which refers to the capability information registered from the image forming apparatus 10 side, and be provided to the document selecting unit 112.

Referring back to FIG. 4, document names 422 of the electronic documents for the user (for example, electronic documents in which access rights of allowing printing of the electronic documents are given to the user) which are transmitted from the document storage 30 in response to the document list request are displayed in the form of a list in the document selection field 420. In a display field of each of the document names 422, a check field 424, which is illustrated in the form of a circle in FIG. 4, is provided. The user operates the input apparatus so as to switch between selection and non-selection of the check field 424 for each of the documents. A black circle indicates a state of selection, and a white circle indicates a state of non-selection. In this example, two documents titled "business planning report.xls" and "2011 activity report.doc" are selected. In this state, when the user selects a start printing button 426, the document selecting unit 112 transmits, to the document storage 30, a print instruction including the identification information of the electronic documents selected to be printed, the print conditions information that is set on the print setting screen 500, and the identification information of the printer object 22 corresponding to the target printer at which printing is to be performed and which is displayed in the printer-name display field 412.

The document storage 30, which receives the instruction, generates print data, e.g., data in the portable document format (PDF), of the electronic documents selected to be printed, and creates print jobs each including the print data and the print conditions information included in the instruction. Then, the document storage 30 transmits, to the print service 20, the print jobs along with the identification information of the printer object 22 which is designated in the print instruction from the image forming apparatus 10 and which is specified as a destination. The print service 20, which receives the print jobs, adds the print jobs to the queue of the printer object 22 specified as the destination. In response to this, the printer object 22 transmits each of the print jobs, i.e., the print data and the print conditions, to the corresponding image forming apparatus 10.

The job receiving unit 116 of the image forming apparatus 10 receives the print job transmitted from the printer object 22, and causes the image forming unit 118 to print the print data in accordance with the print conditions included in the print job.

Alternatively, the printer object 22 may transmit, to the job receiving unit 116, information indicating a storage location of files of the print data and the print conditions, e.g., a uniform resource locator (URL), instead of the print data and the print conditions themselves, and the job receiving unit 116 may download the print data and the print conditions from the storage location.

The image forming apparatus 10 notifies the printer object 22 of state (status) information, such as the start of the execution of the print job received from the printer object 22, the end of the execution, and occurrence of an error during the execution of the print job. Through this notification, the printer object 22 manages the current state of the image forming apparatus 10.

After the end of the execution of the print job, in the case where the user explicitly cancels the user authentication on the image forming apparatus 10, or where the user has not operated the image forming apparatus 10 for a predetermined time period or longer, the user authentication is canceled in the image forming apparatus 10. This canceling of the authentication triggers the service controller 106 to transmit, to the print service 20, a request for deletion of the printer object 22 created in the print service 20 in response to the user authentication which has been made this time. More specifically, upon the transmission of the request for registration of the image forming apparatus 10 with the print service 20 in response to the user authentication performed this time, the service controller 106 has received the identification information of the printer object 22 which has been created in response to the request, from the print service 20 as a response corresponding to the request. Accordingly, the service controller 106 transmits the deletion request including the identification information to the print service 20. In the case of Google Cloud Print, the interface "/delete" may be used for the deletion request. In response to the deletion request, the print service 20 deletes the printer object 22. While the image forming apparatus 10 executes the print job, in the case where an error such as a paper jam occurs, the print job is restarted when the error is resolved because the corresponding printer object 22 is present in the print service 20 as long as the user does not explicitly cancel the user authentication.

The exemplary configuration and the exemplary operations of the system according to the exemplary embodiment have been described. As described above, according to the exemplary embodiment, the image forming apparatus 10 registers itself with the print service 20 in response to the authentication operation performed by a user on the image forming apparatus 10. Thus, even when the image forming apparatus 10 is not registered with the print service 20 in advance as a printer used by the user, on-demand print output is performed from the image forming apparatus 10 via the print service 20. At that time, the user does not necessarily perform a special operation to the image forming apparatus 10, e.g., an operation for registering the image forming apparatus 10 with the print service 20. The user operates the image forming apparatus 10 so as to perform only user authentication which is typically performed for charge, printout management in a company, or the like, whereby the image forming apparatus 10 is automatically registered with the print service 20.

In addition, when the user authentication is canceled, the image forming apparatus 10 deletes the registration of the image forming apparatus 10 from the print service 20, thereby releasing the print service 20 from a load resulting from the state where the print service 20 continues to manage the registration of the image forming apparatus 10, i.e., the printer object 22, which is highly likely to be only used by the user temporarily.

According to the exemplary embodiment, the information about the print conditions which the user specifies to the document selecting unit 112 is transmitted to the document storage 30 along with the information about selected documents, and the document storage 30 transmits the print conditions to the printer object 22. However, this is merely an example. Instead, the information about the print conditions specified by the user may be directly transmitted from the document selecting unit 112 to the printer object 22.

In addition, in the system configuration described with reference to FIG. 1, the image forming apparatus 10 directly communicates with the document storage 30 so as to obtain a list of electronic documents associated with the user, and receives selection of the documents to be printed from the list. However, this configuration is merely an example. Instead, the print service 20 may receive the request for a list of documents from the document selecting unit 112, and the print service 20 may receive a list of the electronic documents for the user from the document storage 30 and provide the list to the document selecting unit 112. In this example, the image forming apparatus 10 may communicate with only the print service 20, and need not communicate with the document storage 30.

The information processor of the exemplary image forming apparatus 10 described above (in the example in FIG. 2, the units that execute the functional modules other than the image forming unit 118) is achieved, for example, by causing a general-purpose computer to execute programs that describe processes of the functional modules. The computer has, for example, as hardware, a circuit configuration in which a microprocessor such as a central processing unit (CPU), memories (primary memories), such as a random access memory (RAM) and a read-only memory (ROM), a hard disk drive (HDD) controller for controlling an HDD, various input/output (I/O) interfaces, a network interface that controls connection with a network such as a local area network, and the like are connected with each other via, for example, a bus. In addition, a disk drive for reading and/or writing from/to a portable disk storage medium, such as a compact disk (CD) or a digital versatile disk (DVD), a memory reader/writer for reading and/or writing from/to a portable nonvolatile storage medium according to various standards, such as a flash memory, and the like may be connected to the bus via, for example, the I/O interfaces. Programs describing the processes of the exemplary functional modules described above are stored in a fixed storage apparatus such as a hard disk drive via a storage medium, such as a CD or a DVD, or via a communication unit such as a network, and are installed in a computer. The programs stored in the fixed storage apparatus are read out into a RAM and executed by a microprocessor such as a CPU, thereby achieving the exemplary functional modules described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an authentication processor that performs a process for user authentication with respect to a user in response to an authentication request from the user;
   a registration unit that registers the image forming apparatus with a print service system on a network as a printer to be used by the user by transmitting, to the print service system, a registration request including user information of the user and information about the image forming apparatus in the case where the user authentication has been successfully performed; and
   a print unit that receives, from the print service system, a print instruction to print an electronic document and that executes printing in response to the print instruction; and
   a deletion-instruction transmitting unit that transmits, to the print service system, an instruction to delete the registration of the image forming apparatus that is used as a printer to be used by the user, after the user authentication has been successfully performed and in response to the user logging out, wherein
   the registration unit registers the image forming apparatus with the print service system in response to the user authentication being successfully performed.

2. The image forming apparatus according to claim 1, further comprising:
   a deletion-instruction transmitting unit that transmits, to the print service system, an instruction to delete the registration of the image forming apparatus that is used as a printer to be used by the user, after the user authentication has been successfully performed and in the case where the user logs out.

3. The image forming apparatus according to claim 2, further comprising:

an instruction unit that, by obtaining and displaying a list of at least one electronic document for the user, the at least one electronic document being stored in a document database, in the case where the user authentication is successfully performed, receiving, from the user, selection of an electronic document to be printed from the displayed list, and transmitting, to the document database, identification information of an printer object which manages the image forming apparatus and which is created in the print service system in response to the registration request, along with the selection result which is received, instructs the document database to transmit, to the printer object, a print instruction to print the electronic document indicated by the selection result.

4. The image forming apparatus according to claim 1, further comprising:

an instruction unit that, by obtaining and displaying a list of at least one electronic document for the user, the at least one electronic document being stored in a document database, in the case where the user authentication is successfully performed, receiving, from the user, selection of an electronic document to be printed from the displayed list, and transmitting, to the document database, identification information of an printer object which manages the image forming apparatus and which is created in the print service system in response to the registration request, along with the selection result which is received, instructs the document database to transmit, to the printer object, a print instruction to print the electronic document indicated by the selection result.

5. A non-transitory computer readable medium storing a program causing a computer to execute a process for controlling an image forming apparatus, the process comprising:

performing a process for user authentication with respect to a user in response to an authentication request from the user;

registering the image forming apparatus with a print service system on a network as a printer to be used by the user by transmitting, to the print service system, a registration request including user information of the user and information about the image forming apparatus in the case where the user authentication has been successfully performed; and receiving, from the print service system, a print instruction to print an electronic document that has been selected and executing printing in response to the print instruction;

transmitting, to the print service system, an instruction to delete the registration that is used as a printer to be used by the user, after the user authentication has been successfully performed and in response to the user logging out, and registering the image forming apparatus with the print service system in response to the user authentication being successfully performed.

6. An image forming method comprising:

performing a process for user authentication with respect to a user in response to an authentication request from the user;

registering the image forming apparatus with a print service system on a network as a printer to be used by the user by transmitting, to the print service system, a registration request including user information of the user and information about the image forming apparatus in the case where the user authentication has been successfully performed;

receiving, from the print service system, a print instruction to print an electronic document that has been selected and executing printing in response to the print instruction;

transmitting, to the print service system, an instruction to delete the registration that is used as a printer to be used by the user, after the user authentication has been successfully performed and in response to the user logging out, and registering the image forming apparatus with the print service system in response to the user authentication being successfully performed.

\* \* \* \* \*